J. W. BIGFORD.
GARDEN TOOL.
APPLICATION FILED MAY 20, 1915.
1,154,839.
Patented Sept. 28, 1915.
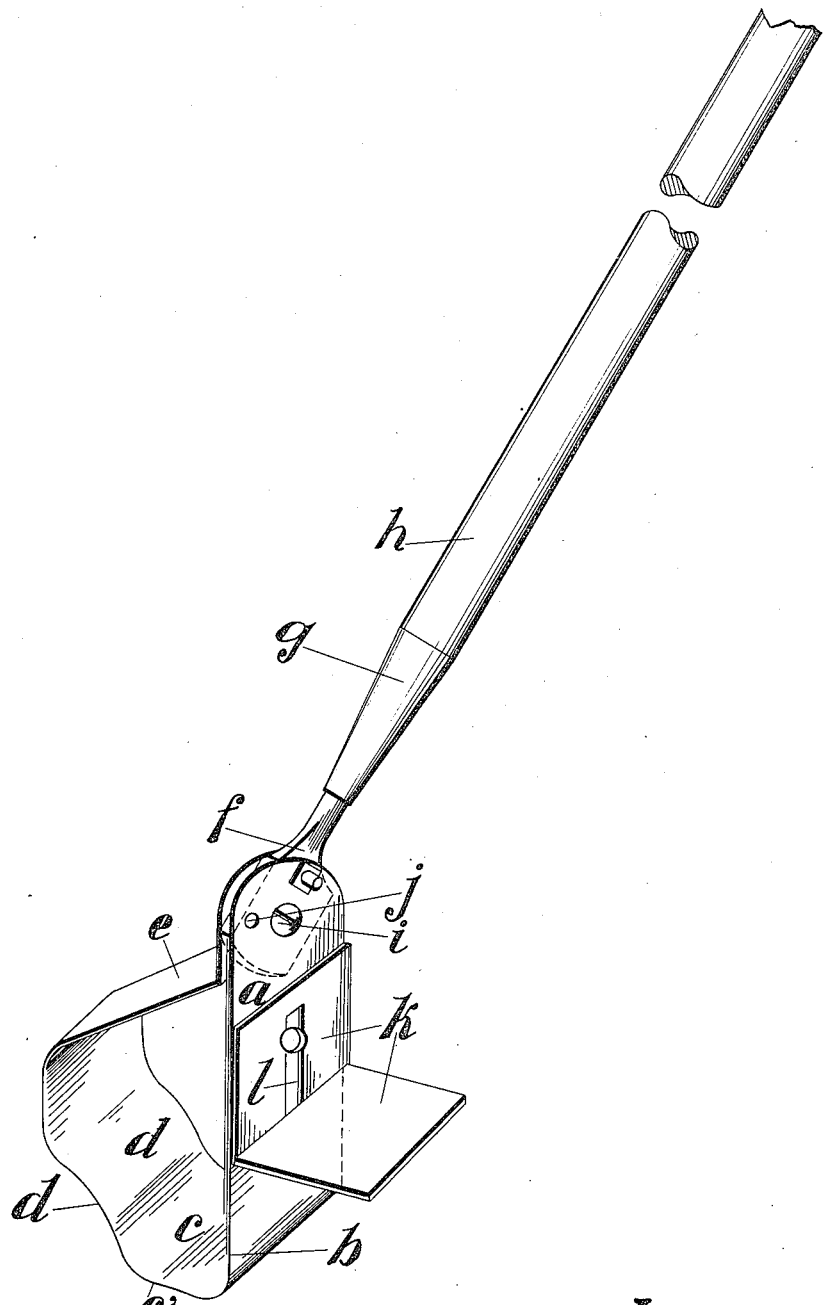
Inventor:
John W. Bigford.
By Chas H Riker
Attorney.

UNITED STATES PATENT OFFICE.

JOHN WESLEY BIGFORD, OF TORONTO, ONTARIO, CANADA.

GARDEN-TOOL.

1,154,839.      Specification of Letters Patent.      Patented Sept. 28, 1915.

Application filed May 20, 1915. Serial No. 29,341.

*To all whom it may concern:*

Be it known that I, JOHN WESLEY BIGFORD, of the city of Toronto, in the county of York and Province of Ontario, Dominion of Canada, have invented certain new and useful Improvements in Garden-Tools; and I hereby declare that the following is a full, clear, and exact description of the same.

My invention relates to a garden tool which may be used either for hoeing or edging purposes, the object of the invention being to so arrange the blade of the tool that it can be used for simultaneously cutting vertically, horizontally and obliquely.

In the trimming of lawns, either where a narrow trench intervenes between the sod and the walk, or where the sod is at a different level than the walk, considerable difficulty is experienced in keeping the edge of the sod properly trimmed, and in keeping the adjoining trench free from weeds.

The tool forming the subject matter of the present invention is particularly designed to cut the edge of the sod perpendicularly to its surface, to cut it in correct parallelism with the walk, and to remove any weeds or grass growing in the trench between the walk and the sod. With this in view, the tool blade is preferably made of a piece of flat steel comprising a vertical member having the lower part of its side edges sharpened for cutting purposes; a curved member extending in an inclined direction from the horizontal member and having its side edges sharpened for sod-cutting purposes; and a connecting member extending in the direction of the vertical member whereby these several parts will form a loop-shaped blade so that the cuttings will collect within it for removal from the trench, the outer side of the vertical member having an adjustable guide for determining the depth of the cut to be made.

For an understanding of the invention, reference is to be had to the following description and to the accompanying drawing, in which the figure represents a perspective view of the tool.

Like characters of reference refer to like parts throughout the specification and drawing.

The blade of the tool consists of a flat vertical member $a$ having the lower ends of its side edges sharpened to form the side cutters $b$, these cutters trimming the vertical side of the trench. At the lower end of the vertical member $a$ is a substantially-horizontal member $c$, the side edges of which are sharpened to form the horizontal cutters $c'$, and extending in an inclined direction from the horizontal member $c$ is a curved member $d$, the side edges of which are also sharpened to form the sod cutters $d'$. Extending from the top of the inclined member $d$ in the direction of the vertical member $a$ is a connecting member $e$ having an upturned lug $f$ in parallelism with the vertical member $a$, and between the lug $f$ and the vertical member $a$ is contained the shank $g$ by which the blade is fastened to the handle $h$. It is possible, however, to make the shank and the blade of an integral character, but I find it preferable to make them as shown in the drawing, and connect the blade to the shank by means of bolts $i$, the lug $f$ and the top of the vertical member being provided with bolt holes $j$ for the reception of the bolts which fasten the blades to the handle, and by means of which the angle of the blade to the handle may be varied.

On the outer side of the vertical member $a$ is an L-shaped plate $k$ having a vertical slot $l$ through which passes a bolt to adjustably connect the L-shaped plate to the blade. The horizontal part of this L-shaped plate is intended to engage either the top of the walk or the top of the sod, as the garden tool is moved along the edges being trimmed, to maintain the bottom of the tool continually at the same depth from the top of the walk.

In using the tool, the blade can either be pushed or drawn along the edge being trimmed, and during its movement, it cuts vertically, horizontally and obliquely, the cuttings falling into the horizontal part of the blade between the cutting edges so that they can be lifted out of the trench by the manipulation of tool itself.

Having thus fully described the nature of my invention, what I claim as new and desire to secure by Letters Patent, is:—

A garden tool comprising a vertical cutting member, a substantially-horizontal cutting member extending therefrom, a substantially-inclined member extending upwardly from the horizontal member, a connecting member extending from the inclined member in the direction of the vertical member, means for connecting the blade to the handle, said means comprising a lug extending upwardly from the connecting member in parallelism with the vertical member, a shank, and bolts passing through the shank and said lug and vertical member to adjustably connect the blade to the shank, and a guide adjustably connected to the vertical cutting member to maintain the uniformity of the depth of the cut.

Toronto, May 13th, 1915.

JOHN WESLEY BIGFORD.

Signed in the presence of—
CHAS. H. RICHES,
EDWARDS BERNSTEIN.